US008888598B2

(12) United States Patent
Mehta et al.

(10) Patent No.: US 8,888,598 B2
(45) Date of Patent: Nov. 18, 2014

(54) TRANSACTION SYSTEMS AND METHODS FOR VIRTUAL ITEMS OF MASSIVELY MULTIPLAYER ONLINE GAMES AND VIRTUAL WORLDS

(75) Inventors: Kaushal N. Mehta, Fremont, CA (US); Dan Elias Kolkowitz, Los Altos Hills, CA (US); Subramanian V. Peruvemba, Santa Clara, CA (US)

(73) Assignee: Playspan, Inc., Santa Clara, CA (US)

( * ) Notice: Subject to any disclaimer, the term of this patent is extended or adjusted under 35 U.S.C. 154(b) by 868 days.

(21) Appl. No.: 11/974,861

(22) Filed: Oct. 16, 2007

(65) Prior Publication Data

US 2008/0220876 A1 Sep. 11, 2008

Related U.S. Application Data

(60) Provisional application No. 60/852,053, filed on Oct. 17, 2006.

(51) Int. Cl.
| | |
|---|---|
| A63F 9/24 | (2006.01) |
| G06F 17/00 | (2006.01) |
| A63F 13/30 | (2014.01) |
| G06Q 30/08 | (2012.01) |
| G07F 17/32 | (2006.01) |

(52) U.S. Cl.
CPC .......... *A63F 13/12* (2013.01); *A63F 2300/575* (2013.01); *G06Q 30/08* (2013.01); *G07F 17/3281* (2013.01)
USPC .......................................................... 463/42

(58) Field of Classification Search
CPC .................................................... A63F 13/12

USPC .................................................. 463/1, 25, 42
See application file for complete search history.

(56) References Cited

U.S. PATENT DOCUMENTS

| | | | | |
|---|---|---|---|---|
| 6,118,427 | A * | 9/2000 | Buxton et al. | 345/629 |
| 6,119,229 | A * | 9/2000 | Martinez et al. | 726/28 |
| 8,090,618 | B1 * | 1/2012 | Chu | 705/26.1 |
| 2001/0037316 | A1 * | 11/2001 | Shiloh | 705/74 |
| 2003/0177187 | A1 | 9/2003 | Levine et al. | |
| 2004/0266505 | A1 * | 12/2004 | Keam et al. | 463/1 |
| 2006/0195379 | A1 * | 8/2006 | Abecassis et al. | 705/35 |
| 2007/0087831 | A1 * | 4/2007 | Van Luchene et al. | 463/42 |
| 2007/0111770 | A1 * | 5/2007 | Van Luchene | 463/7 |
| 2007/0117615 | A1 | 5/2007 | Van Luchene | |
| 2007/0129124 | A1 | 6/2007 | Van Luchene | |
| 2007/0129126 | A1 | 6/2007 | Van Luchene | |
| 2007/0155508 | A1 * | 7/2007 | Sun et al. | 463/42 |
| 2007/0168309 | A1 * | 7/2007 | Tzruya et al. | 706/45 |

(Continued)

OTHER PUBLICATIONS

E. Shayotovich, "Taxing Virtual Earnings—Seriously," Business Week, May 2, 2006.

(Continued)

*Primary Examiner* — Paul A D'Agostino
(74) *Attorney, Agent, or Firm* — Kilpatrick Townsend & Stockton LLP

(57) ABSTRACT

Systems and methods for trading, exchanging, and/or valuating virtual items that exist in MMOGs or other types of virtual worlds. According to various embodiments, the present invention utilizes a homogenous database to store virtual objects and their attributes across different MMOGs and virtual worlds. The items in the database are indexed and searchable. Using the system, users can trade, exchange, sell and/or valuate their virtual objects.

20 Claims, 3 Drawing Sheets

(56) References Cited

U.S. PATENT DOCUMENTS

2007/0218987 A1 9/2007 Van Luchene et al.
2007/0225071 A1 9/2007 Van Luchene et al.
2007/0238499 A1 10/2007 Wright
2007/0240119 A1 10/2007 Ducheneaut et al.

OTHER PUBLICATIONS

S. Schiesel, "Entropria Universe Players Can Cash Their Online Earnings at the A.T.M.," New York Times, May 2, 2006.
R. Walker, "Selling to Avatars, New York Times," Oct. 1, 2006.

* cited by examiner

TRANSACTION SYSTEMS AND METHODS FOR VIRTUAL ITEMS OF MASSIVELY MULTIPLAYER ONLINE GAMES AND VIRTUAL WORLDS

PRIORITY CLAIM

The present application claims priority to U.S. provisional patent application Ser. No. 60/852,053, filed Oct. 17, 2006, which is incorporated herein by reference.

BACKGROUND

The present invention relates generally to massively multiplayer online games (MMOGs) and virtual worlds, and, more particularly, to systems and methods for trading virtual items pertaining to MMOGs and virtual worlds.

MMOGs are online computer games capable of supporting hundreds or thousands of players simultaneously. Millions of users worldwide have created a virtual identity or avatar on various MMOGs and other virtual online worlds. Users of virtual worlds spend hundreds of hours playing and creating their virtual identities and winning various virtual items and currencies, which they desire to trade for other virtual items in the same virtual world or in other virtual worlds. Currently there is no system that allows MMOG users to list their virtual items and to see comparably valued virtual or physical items in the same listing context. Also, there currently is no way for MMOG users to exchange a virtual item for another non-virtual or physical item. Also, there is currently no automatic way to put a consistent monetary value on a virtual item. Further, there is no current way for MMOG to take their belongings when they migrate from one virtual world to another.

SUMMARY

In one general aspect, the present invention is directed to systems and methods for trading, exchanging, and/or valuating virtual items that exist in MMOGs or other types of virtual worlds. According to various embodiments, the present invention utilizes a homogenous database to store virtual objects and their attributes across different MMOGs and virtual worlds. The items in the database are indexed and searchable. Using the system, users can trade, exchange, sell and/or valuate their virtual objects.

FIGURES

Various embodiments of the present invention are described herein by way of example in conjunction with the following figures wherein.

DETAILED DESCRIPTION

MMOGs are computer games, played over the Internet, that are capable of supporting hundreds or thousands of players simultaneously. Virtual worlds are computer-based, three-dimensional, simulated graphical environments intended for its users to inhabit and interact using virtual identities called "avatars." Some, but not all, virtual worlds allow for multiple users. For the sake of convenience, both MMOGs and virtual worlds (VWs) will be referred to as MMOGs hereinbelow unless otherwise specifically noted since VWs can be considered role-playing games. Also for the sake of convenience, characters and virtual identities in both MMOGs and VWs are referred to as "avatars."

Figure 1:
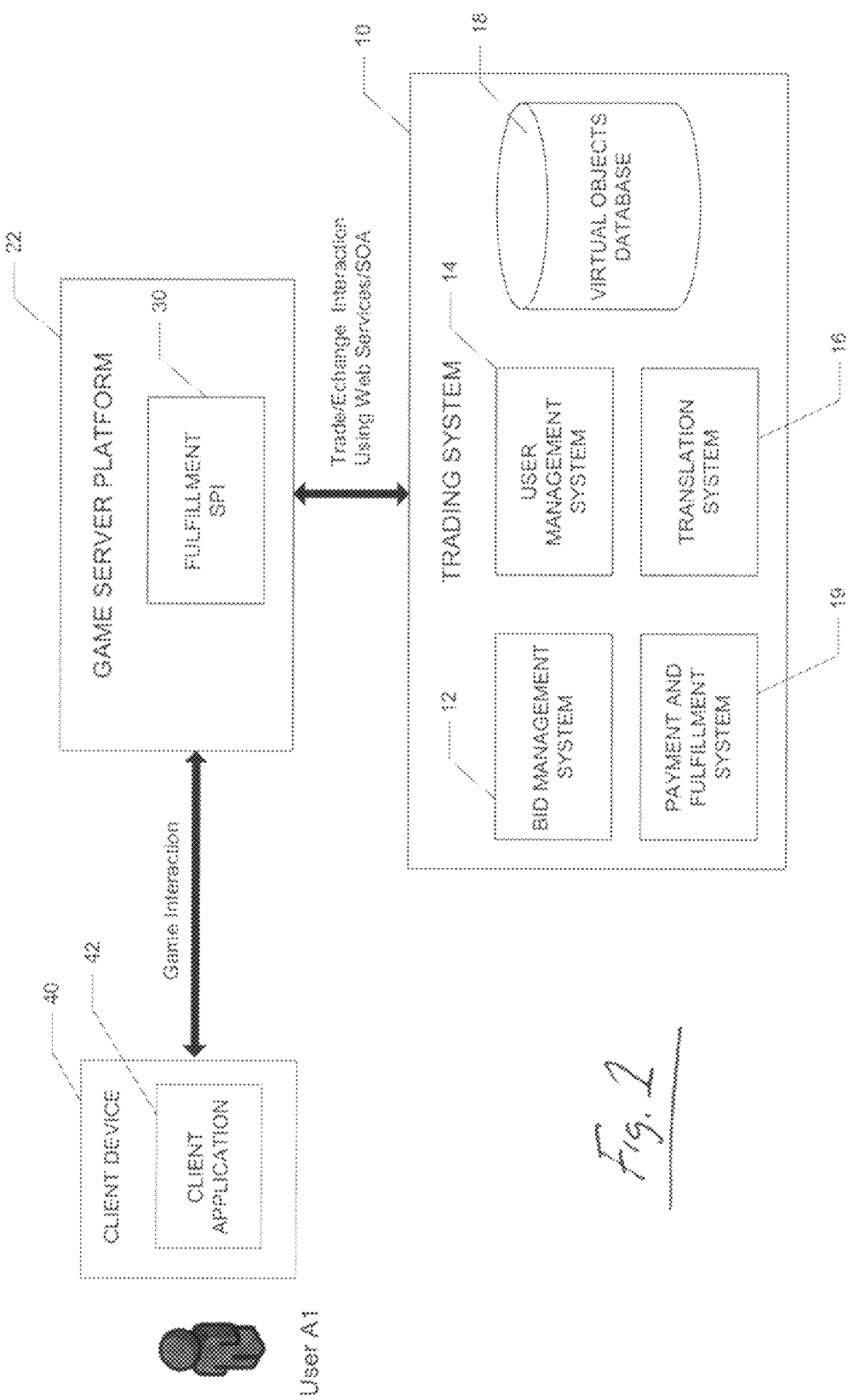
FIG. 1 is a simplified diagram of a virtual game system architecture according to various embodiments of the present invention.

Virtual worlds and MMOGs have no limit on the number or kinds of items that can be created within them. These items can be considered "virtual goods" or "virtual items." According to various embodiments, the present invention is directed to systems and methods for trading, exchanging, and/or valuating virtual items that exist in MMOGs or other types of virtual worlds. FIG. 1 is a diagram of a virtual game system architecture for trading virtual items pertaining to MMOGs according to various embodiments of the present invention. The virtual game system architecture comprises a virtual item trading system 10, which may be implemented as one or a number of servers. The virtual item trading system 10 may comprise a number of software engines or modules providing different functions related to the trading, exchanging, and/or valuating of virtual items, as described further below. The virtual item trading system 10 may be in communication with a game server platform 22 that comprises one or more servers through which end-users can play MMOGs. An end-user or game player at a client device 40 may download a client game application 42 that facilitates playing a MMOG provided by the game server platform 22.

As shown in FIG. 1, the virtual item trading system 10 may comprise a bid management module 12 that allows authenticated users to list and execute actual trades for virtual objects that have been registered, recognized and retrieved by the virtual game system architecture. The virtual item trading system 10 may also comprise a user management module 14 that allows virtual and physical users to be accessed through a common universal ID, for example. The ID may identify and authenticate the different virtual and physical users to the local game server (e.g., a game server at game server platform 20) and the virtual item trading system 10.

A translation module 16 may translate the properties and attributes of virtual items to a common virtual object format for storage in a virtual objects database 18. The translation module 16 may also create indexes and tags around those attributes and properties so that the virtual items become searchable within the database 18. The translation module 16 may also provide a translation of the virtual world currency to a common or real world currency to enable the valuation of the virtual item in the common or real world currency. In that way, virtual items from different MMOGs can be valued with respect to a common currency.

The translation module 16 may value the virtual items based on transaction history data in the database 18 for the virtual items that is indicative of the interest in the items. Virtual items having a higher interest will be valued higher than items having lesser interest. That is, transaction information for past transactions may be stored in the database 18, and that data can be used to assess the overall interest in particular virtual items. Also, currencies for different games can be translated to the common currency based on an exchange rate that is based on the demand for the game currencies outside of their particular games.

The translation module 16 may translate information received from users regarding their virtual items into a homogenous format for storage in the virtual objects database 18. Storing the items and their attributes in a homogenous format facilitates indexing, tagging and searching of items in response to trade, exchange, sale, or valuation requests from users. Moreover, using a homogenous format allows virtual items from different MMOGs and different virtual worlds to be stored in a common format, which facilitates exchanges and valuations across different virtual worlds. According to various embodiments, the homogenous format may be similar to the v-card format. For example, the data format may specify, if known, the some or all of the following attributes of a virtual item: user ID; avatar ID; MMOG; game server (for MMOGs having multiple servers); game level; virtual item (or instance) ID; etc.

The following provides a brief description of an example of how a user may register and exchange a virtual item. A user of a MMOG may access a web page associated with the virtual item trading system 10 to catalog their virtual items. At the web site, the user may establish an account (if they do not already have one). Then the user, using online forms available through the website, for example, may provide an inventory of the virtual items they possess. This may include virtual items in different MMOGs and/or other virtual worlds. In other embodiments, the user may specify the items it wishes to sell, trade for, buy, etc. through a graphical user interface provided by the client application 42. In any case, the virtual items that the user wishes to buy, sell, trade for, or otherwise transact for are stored in the database 18 using the common format, the format identifying, among other things, the goods and the user/avatar, as well as other possible information as mentioned above.

Figure 2:
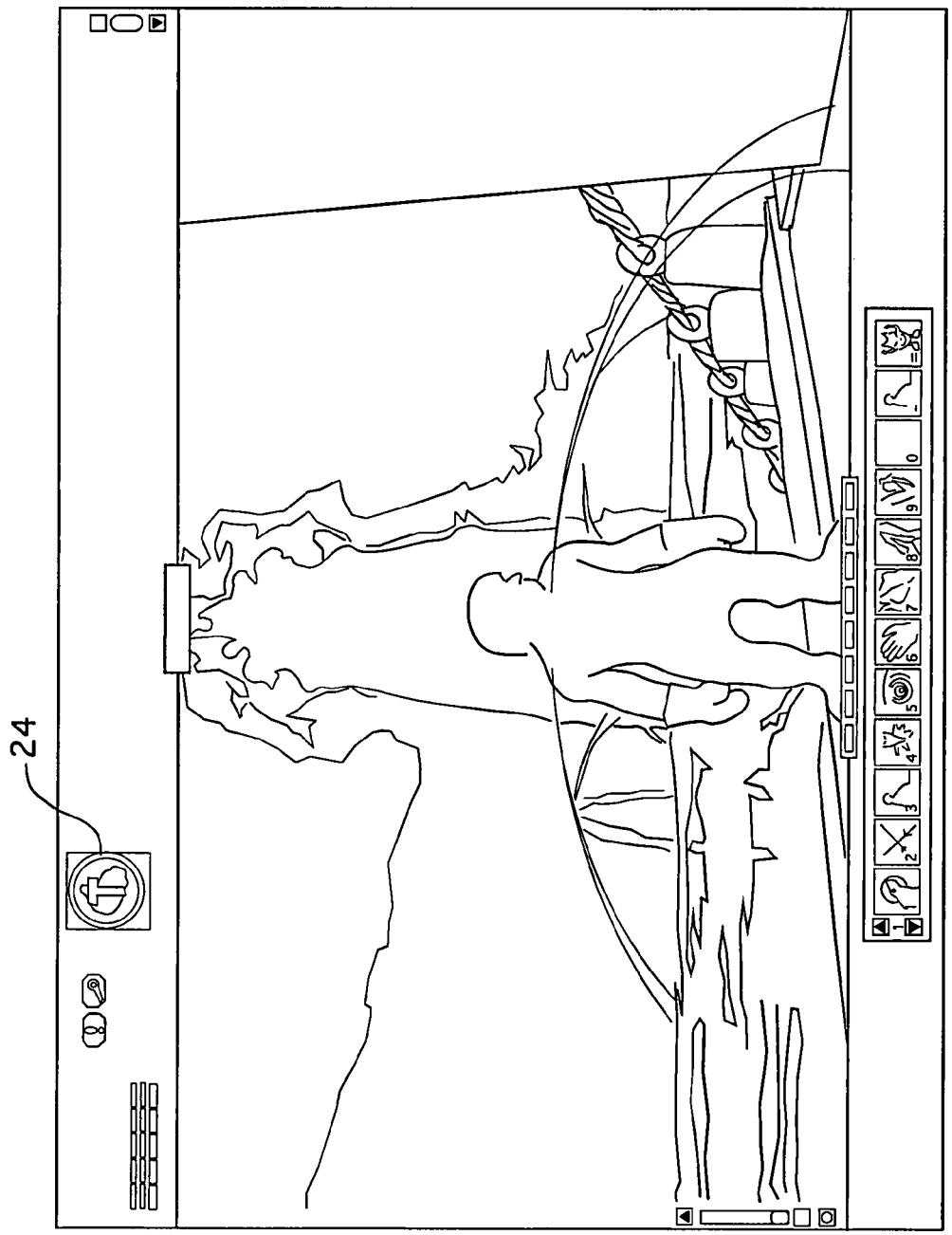
FIGS. 2 and 3 are diagrams illustrating aspects of the present invention according to various embodiments.
Figure 3:
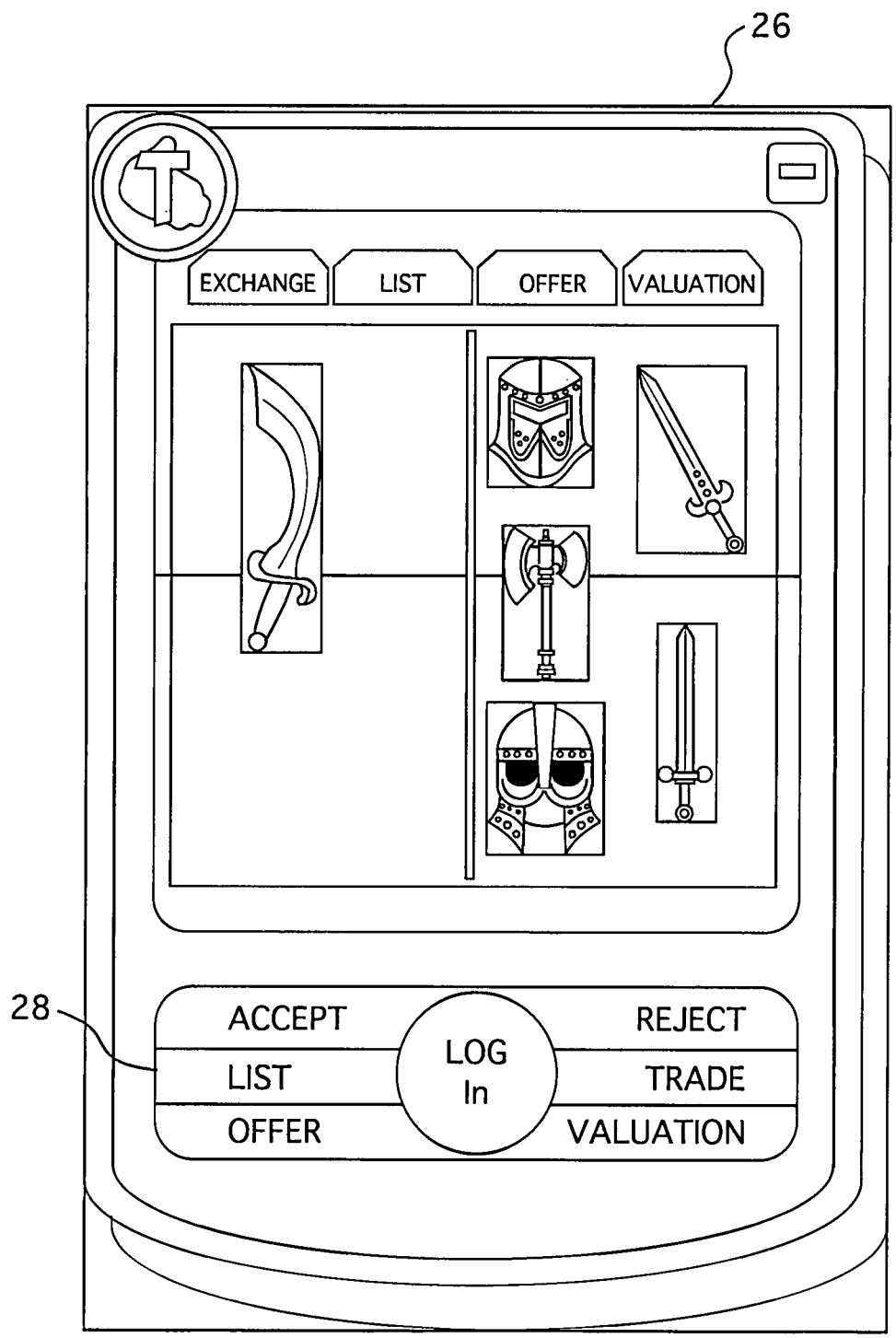

According to various embodiments, when the user is playing a MMOG through the game server platform 22, the game may display an icon 24, shown in FIG. 2, on a monitor or display unit of the client device 40. The software for supplying the interface may exist as part of the client application 42 and the game software (at game server platform 22). The icon 24 displayed on the client device monitor may be translucent so as to not obscure parts of the game display. When the user clicks on or otherwise activates the icon 24, a trading/exchange graphical user interface 26, as shown in FIG. 3, may be displayed for the user on the user's monitor or display unit. The trading/exchange graphical user interface 26 may also be translucent on the user's game console or monitor so that the user can perform the trade-related functions provided by the interface 26 while still playing the game if so desired. The software for supplying the interface 26 may reside at the client application 42, the game server platform 22, and/or, through hooks into the client application 42 and the game server platform 22, at the virtual item trading system 10.

The MMOGs may adapt the appearance of the interface for the motif of their MMOG using, for example, software development kit (SDK) from the entity administering the virtual item trading system 10. Through the interface 26, the user may, for example, exchange, list, offer for sale, or valuate their virtual items. The user's actions with respect to the trading interface may be communicated to the virtual item trading system 10 via the game server platform 22, as shown in FIG. 1. In response to the user's actions, the virtual item trading system 10 may respond with the desired information, which may be displayed for the user on the interface 26. For example, if the user wants to exchange an item (e.g., the sword shown in the left-hand portion of the interface 26 in FIG. 3), the virtual item trading system 10 may respond with other items that the user may exchange for the item. The possible exchange items may be determined by searching the virtual objects database 18, and may comprise items that other users wish to exchange for the sword and/or items that the game itself is willing to exchange. In a similar manner, the user could offer to sell and/or valuate their virtual items.

The virtual item trading system 10 may be in communication with numerous game server platforms 22 (although only one is shown in FIG. 1 for convenience), each such game server platform providing a different MMOG. The game server platforms may be in communication with the virtual item trading system 10 via secure TCP/IP connections using web services/SOA, for example.

According to various embodiments, when in the gaming environment ("in-game trading"), a user A1 (at client device 40 in FIG. 1, for example) wishes to trade an item or items, the following actions may occur. First, through the connection between the game server platform 22 and the virtual item trading system 10, the user is identified and authenticated to the user management module 14. The game server platform 22 may then propagate the user's in-game trade request to the virtual item trading system 10. The bid management module 12 may then build the list of available items to trade and send the results back to the game server platform 22. The list may be generated based on a search of the virtual objects database 18. The results could be restricted or filtered. The items returned by the virtual item trading system 10 may be items that have been put up for trade or sale by other users in the same or different virtual worlds as user A1 in the same way as described here. The user A1 may exchange "in-game" user objects with the results returned above. The user A1 may also choose not to trade, but instead leave their items up for trade. The user may also identify specific requests when it lists an item for trade (such as other types of item the user is looking for in a trade). The specific request may be stored with the virtual item trading system 10 and facilitate the searching process described above.

The exchange may be performed using the interface 26 by simple drag operations according to various embodiments. For example, with reference to FIG. 3, if the user wished to trade the sword in the left-hand portion of the exchange interface 26 for one of the items on the right-hand portion (which the virtual item trading system 10 identified as possible trade items based on its search of the virtual objects database 18 as described above), the user could drag its sword to the right-hand portion of the interface and drag the item it desires in return (such as one of the masks) to the left-hand portion of the interface. The user then could initiate execution of the trade by activating the "Accept" key 28. The game server platform 22 may then propagate the exchange request to the virtual item trading system 10, which executes the trade. The response from virtual item trading system 10 may be intercepted by a fulfillment SPI (Server Provider Interface) 30 of the game server platform 22, which may fulfill the item exchange request. The outcome of the fulfillment operation (e.g., success or failure) may be sent to the virtual item trading system 10 to complete the transaction.

A tradeable virtual object may have an instance id which uniquely identifies the object in an in-game environment. This allows fulfillment SPI implementation by the payment and fulfillment module 19 of the virtual item trading system 10. In addition to instance id, trade/exchange requests from the game server platform 22 may provide a pseudo user name, game server identifier and other non-identifiable user information to the virtual item trading system 10 for transaction, payment processing, and fulfillment.

If the user did not find a suitable item or set of items for exchange, it can choose to list them for trading via the virtual item trading system 10. The virtual item trading system may allow trades to complete asynchronously when only one user is interacting with the game or game server. Also, when the user lists an item or a set of items for trading, the user may specify what it wants in return. The virtual item trading system can you this criteria when searching the database for appropriate tradeable items.

The virtual item trading system 10 may provide numerous services for its users. As described above, it may provide publishing services (e.g., publishing of tradeable items), valuation services (e.g., valuation of tradeable items), listing services (e.g., listing of tradeable or exchangeable items), offering services (e.g., tradeable items offer services) and execution services (e.g., transaction services, payment services), etc. The virtual item trading system 10 may valuate the items based past trade/exchange data for the same or similar items. Users may access the services via the web site associated with the virtual item trading system 10, for example. In that way, for example, a user may list an item or a set of items with unspecified return expectations using the tradeable items offer service. Other users may respond with offers and if the user accepts one of the offers, the trade may be completed. This functionality provides a marketplace for users to interact anonymously and exchange offers. In addition, a user may specify a time in the future when it will sell its listed item to the highest bidder. Other auction formats may also be employed.

The various modules of the virtual game system architecture 10 described above may be implemented as software modules or engines containing software instructions to be executed by one or more processors of the virtual item trading system 10 using any suitable language. The modules may be written in any suitable programming language and may be stored in any suitable computer readable medium, as described further below.

Thus, in one general aspect, the present invention is directed to a virtual game system comprising a computerized virtual item trading system 10 for communicating with one or more virtual game servers 22, wherein each virtual game server is for providing a virtual online game (e.g., MMOG or VW role-playing game) to users thereof. The virtual item trading system 10 is programmed to: (i) translate attributes of virtual items from the one or more virtual online games to a homogenous virtual object data format; (2) store the attributes of the virtual items in the homogenous virtual object data format in the database 18; and (iii) in response to search query, search the database 18 for one or more virtual items responsive to the search query. The virtual item trading system may further be programmed to determine a value for the virtual items, including a value according to a common currency across multiple MMOGs. The virtual item trading system 10 may further be programmed to execute a transaction for a virtual item, such as an exchange, sale, or purchase.

In another general aspect, the present invention is directed to a method for transacting virtual items used in such virtual online games. The method may comprise the steps of: (1) receiving attribute data for the virtual items; (ii) storing the attribute data in a database 18 using a homogenous virtual object data format for each virtual item; (iii) searching, in response to search query, the database 18 for one or more virtual items responsive to the search query; and (iv) executing a transaction involving at least one of the virtual items. User (or players) of the virtual online games may enter the attribute data for the virtual items via a web site or via an in-game interface. The in-game interface may be launched by the user by activating a translucent icon on the user's game display (see FIG. 2). The in-game user interface may further allow a user to request a transaction involving a virtual item (see FIG. 3).

In yet another general aspect, the present invention is directed to a virtual game system comprising: (i) a game server platform 22 comprising one or more game servers that provide a virtual online game to users; (ii) a plurality of user client devices 40 in communication with the game server platform 22, each client user device 40 potentially comprising a client application 42; and (iii) a computerized virtual item trading system 10 in communication with the game server platform 22. The virtual item trading system 10 is programmed to: (i) translate attributes of virtual items from the virtual online game to a homogenous virtual object data format; (ii) store the attributes of the virtual items in the homogenous virtual object data format in a database 18; and (iii) in response to search query, search the database 18 for one or more virtual items responsive to the search query. The virtual item trading system 10 may be further programmed to determine a value for the virtual items. Also, the virtual item trading system 10 may be programmed to execute a transaction for a virtual item.

The virtual item trading system 10 may be in communication with multiple game server platforms 22, each game server platform 22 providing a different online virtual game. Further, the virtual item trading system 10 may be programmed to value virtual items from the plurality of online virtual games according to a common currency and to transact items across multiple games, as described above.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments. It is further to be understood that the figures and descriptions of the embodiments have been simplified to illustrate elements that are relevant for a clear understanding of the embodiments, while eliminating, for purposes of clarity, other elements.

In general, it will be apparent to one of ordinary skill in the art that at least some of the embodiments described herein may be implemented in many different embodiments of software, firmware and/or hardware. The software and firmware code may be executed by a processor or any other similar computing device. The software code or specialized control hardware which may be used to implement embodiments is not limiting. For example, embodiments described herein may be implemented in computer software using any suitable computer software language type, such as, for example, C, C++, C#, Java, Virtual Basic, etc., using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media. Such media may include any of the forms listed above with respect to storage devices and/or, for example, a modulated carrier wave, to convey instructions that may be read, demodulated/decoded, or executed by a computer or computer system.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent and/or semitemporary. A computer-readable medium may further include one or more data signals transmitted on one or more carrier waves.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations and adaptations to those embodiments may occur to persons skilled in the art with attainment of at least some of the advantages. The disclosed embodiments are therefore intended to include all such modifications, alterations and adaptations without departing from the scope of the embodiments as set forth herein.

What is claimed is:

1. A virtual game system comprising:
  a computerized virtual item trading system for communicating with two or more virtual game servers, wherein the two or more virtual game servers provide two or more different virtual online games, and wherein the virtual item trading system is programmed to:
    translate attributes of virtual items from the two or more different virtual online games to a homogenous virtual object data format using a translation module, thereby creating indexes and tags around the attributes such that the virtual items from the two or more different virtual online games are searchable by the attributes, wherein the attributes include a type of virtual item;
    valuate, by the translation module, the virtual items from the two or more different virtual online games based on the relative interest in the virtual items in relation to other virtual items based on transaction histories of the virtual items;
    convert two or more virtual currencies associated with the two or more virtual online games, by the translation module, to a common virtual currency that is common to the two or more different virtual online games, based on demand for the two or more virtual currencies outside of the two or more virtual online games;
    store the attributes of the virtual items in the homogenous virtual object data format in a database;
    receive a search query initiated by activating an icon on a trading/exchange graphical user interface provided by downloading a client application to one or more client devices or provided by a client application residing at a game server platform wherein the one or more client devices are in communication with the game server platform, the graphical user interface providing search queries for exchange, sell, and valuation requests;
    in response to the search query, search the database for one or more virtual items that match the type of virtual item corresponding to the search query;
    return a list of available virtual items and their associated values filtered to meet the type of virtual item corresponding to the search query, wherein the list of available virtual items comprises items for exchange, sale, and valuation based on the respective search query; and
    execute transactions for the virtual items.

2. The virtual game system of claim 1 wherein the attributes include a user identification.

3. The virtual game system of claim 1 wherein the attributes include an avatar identification.

4. The virtual game system of claim 1 wherein the attributes include a massively multiplayer online game identification.

5. The virtual game system of claim 1 wherein the attributes include a game server identification.

6. The virtual game system of claim 1 wherein the attributes include a game level identification.

7. The virtual game system of claim 1, wherein the virtual item trading system is further programmed to receive attribute data for the virtual items.

8. The virtual game system of claim 7, wherein the virtual item trading system is further programmed to receive the attribute data via a web-interface.

9. The virtual game system of claim 7, wherein the virtual item trading system is further programmed to receive the attribute data via the graphical user interface.

10. The virtual game system of claim 1 wherein the computerized virtual item trading system is programmed to allow for the transactions to be conducted using the common virtual currency.

11. The virtual game system of claim 1 wherein the graphical user interface is translucent so that the user can perform trade-related functions while playing an online game.

12. The virtual game system of claim 11 wherein the system is further programmed to valuate items based upon past trade/exchange data for the same or similar items.

13. The virtual game system of claim 1 wherein each transaction is executed using a pseudo user name.

14. The virtual game system of claim 1 wherein an interface to the virtual game system is adaptable using a software development kit from the entity administering the virtual item trading system.

15. The virtual game system of claim 1, wherein the virtual item trading system is further programmed to provide virtual item auction functionality which allows for purchases of items using the common virtual currency.

16. The virtual game system of claim 15, wherein the virtual item trading system is further programmed to allow users to list items with unspecified return expectations.

17. The virtual game system of claim 1 wherein virtual item trading system further comprises a bid management module.

18. The virtual game system of claim 1 wherein virtual item trading system is further programmed to authenticate virtual or physical users using a common universal ID.

19. The virtual game system of claim 18 wherein the virtual item trading system further comprises a user management module.

20. A method performed by a virtual game system comprising a computerized virtual item trading system for communicating with two or more virtual game servers, wherein the two or more virtual game servers provide two or more different virtual online games, the method comprising:

translating attributes of virtual items from the two or more different virtual online games to a homogenous virtual object data format using a translation module, thereby creating indexes and tags around the attributes such that the virtual items from the two or more different virtual online games are searchable by the attributes, wherein the attributes include a type of virtual item;

valuating, by the translation module, the virtual items from the two or more different virtual online games based on the relative interest in the virtual items in relation to other virtual items based on transaction histories of the virtual items;

converting two or more virtual currencies associated with the two or more virtual online games, by the translation module, to a common virtual currency that is common to the two or more different virtual online games, based on demand for the two or more virtual currencies outside of the two or more virtual online games;

storing the attributes of the virtual items in the homogenous virtual object data format in a database;

receiving, by the virtual item trading system, a search query initiated by activating an icon on a trading/exchange graphical user interface provided by downloading a client application to one or more client devices or provided by a client application residing at a game server platform wherein the one or more client devices are in communication with the game server platform, the graphical user interface providing search queries for exchange, sell, and valuation requests;

and executing, by the virtual trading system, transactions for the virtual items.

* * * * *